(12) United States Patent
Stolte et al.

(10) Patent No.: US 9,174,740 B2
(45) Date of Patent: Nov. 3, 2015

(54) SYSTEM FOR SUPPLYING AN AIRCRAFT WITH INERT GAS, METHOD FOR SUPPLYING AN AIRCRAFT WITH INERT GAS, USE OF A MEMBRANE AND AIRCRAFT

(71) Applicants: Airbus Operations GmbH, Hamburg (DE); Deutsches Zentrum fur Luft-und Raumfahrt e.V., Cologne (DE)

(72) Inventors: Ralf-Henning Stolte, Hamburg (DE); Johannes Lauckner, Hamburg (DE); Gwenaelle Renouard-Vallet, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 17 days.

(21) Appl. No.: 14/091,849

(22) Filed: Nov. 27, 2013

(65) Prior Publication Data
US 2014/0150649 A1 Jun. 5, 2014

Related U.S. Application Data

(60) Provisional application No. 61/731,610, filed on Nov. 30, 2012.

(30) Foreign Application Priority Data

Nov. 30, 2012 (DE) .......................... 10 2012 222 020

(51) Int. Cl.
*B01D 53/22* (2006.01)
*B64D 33/04* (2006.01)
*B64D 37/32* (2006.01)
*B64D 41/00* (2006.01)

(52) U.S. Cl.
CPC ................ *B64D 33/04* (2013.01); *B64D 37/32* (2013.01); *B64D 2041/002* (2013.01); *B64D 2041/005* (2013.01); *Y02T 90/36* (2013.01)

(58) Field of Classification Search
CPC .... B01D 53/22; B01D 63/06; B01D 2257/80; B01D 2258/0208; B64D 33/04; B64D 37/32; B64D 2041/005
USPC .................................................. 95/52; 96/10
See application file for complete search history.

(56) References Cited

U.S. PATENT DOCUMENTS 7,759,011 B2 7/2010 Hoffjann et al.
8,567,516 B2 10/2013 Bleil et al.
(Continued)

FOREIGN PATENT DOCUMENTS

DE 102009040013 A1 * 3/2011 ............ H01M 8/04

OTHER PUBLICATIONS

German Searching Authority, German Search Report for Application No. 10 2012 222 020.8 Dated Nov. 25, 2013.

*Primary Examiner* — Jason M Greene
(74) *Attorney, Agent, or Firm* — Ingrassia, Fisher & Lorenz, P.C.

(57) ABSTRACT

A system for supplying an aircraft with inert gas is provided. The system includes at least one fuel cell with an air inlet and an exhaust air outlet as well as a membrane device with an inlet, an outlet and a vapor-permeable membrane. The exhaust air outlet is in fluid communication with the inlet of the membrane device. The membrane device guides a gas from the inlet to the outlet and to give off to the outside through the membrane any water vapor contained therein. This leads to a cost efficient, passive and reliable dehumidifaction of inert exhaust gas for inerting purposes, and a dehumidification device that does not or only marginally increases the weight of the aircraft.

16 Claims, 3 Drawing Sheets

(56) References Cited

U.S. PATENT DOCUMENTS

| | | | |
|---|---|---|---|
| 2006/0101994 A1* | 5/2006 | Berger et al. | 95/52 |
| 2007/0111060 A1* | 5/2007 | Hoffjann et al. | 429/22 |
| 2007/0287036 A1* | 12/2007 | Kondo et al. | 429/13 |
| 2008/0083335 A1* | 4/2008 | Hruby et al. | 96/6 |
| 2009/0301306 A1* | 12/2009 | Ooya | 96/6 |
| 2012/0210747 A1* | 8/2012 | Hoffjann et al. | 62/540 |
| 2012/0261512 A1 | 10/2012 | Stolte et al. | |
| 2014/0004434 A1* | 1/2014 | Saballus et al. | 429/414 |

* cited by examiner

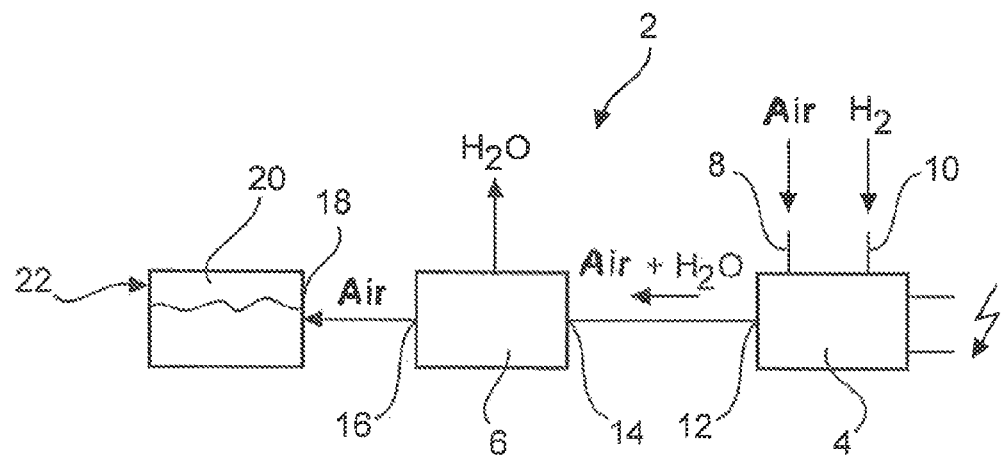
Fig. 1
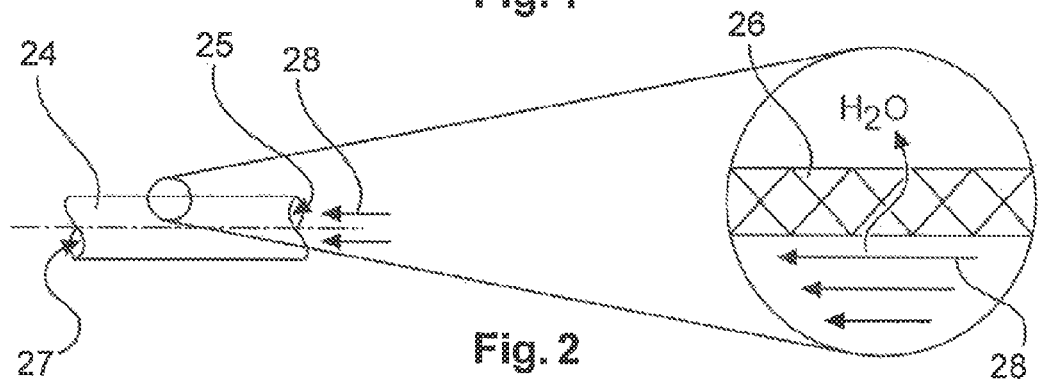
Fig. 2
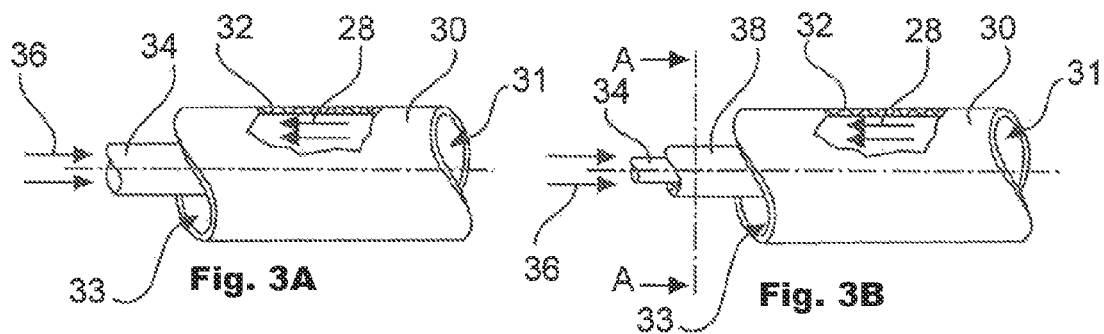
Fig. 3A  Fig. 3B
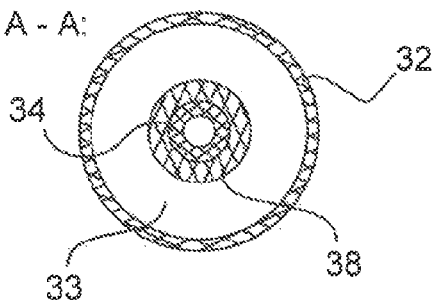
A-A

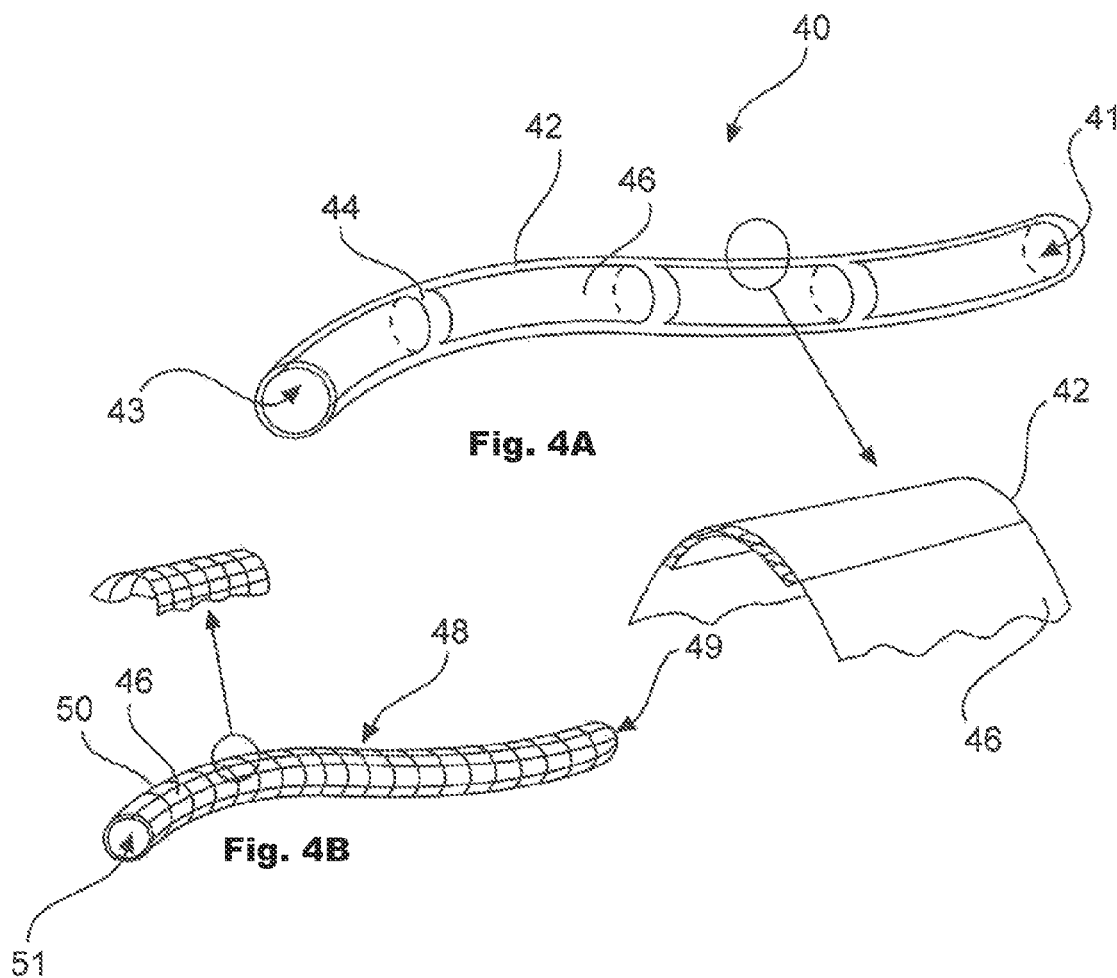
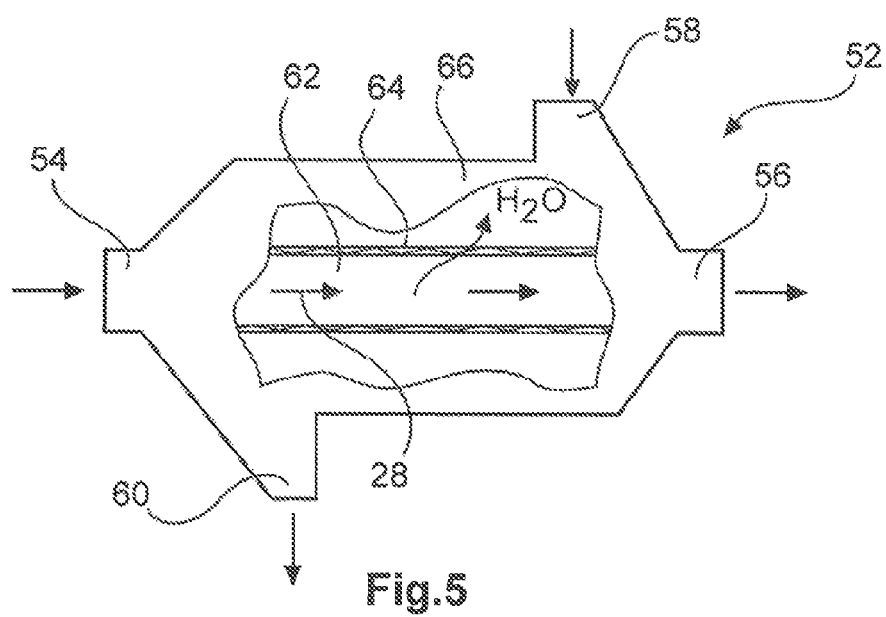

SYSTEM FOR SUPPLYING AN AIRCRAFT WITH INERT GAS, METHOD FOR SUPPLYING AN AIRCRAFT WITH INERT GAS, USE OF A MEMBRANE AND AIRCRAFT

CROSS-REFERENCE TO RELATED APPLICATIONS

This application claims priority to German Patent Application No. 10 2012 222 020.8, filed Nov. 30, 2012, and to U.S. Provisional Patent Application No. 61/731,610, filed Nov. 30, 2012, which are each incorporated herein by reference in their entirety.

TECHNICAL FIELD

This application pertains to a system for supplying an aircraft with inert gas, to a method for supplying an aircraft with inert gas, to the use of a membrane for dehumidifying exhaust air from a fuel cell, and to an aircraft.

BACKGROUND

The integration of fuel cells in an aircraft contributes to noise reduction and to an improvement in the overall efficiency of the aircraft because, apart from the efficient provision of electrical power, all the products arising from the operation of fuel cells can be used within the aircraft. By-products that arise are, for example, water, oxygen depleted exhaust air, and heat. While water is predestined for applications in wet cells or for the humidification of air, oxygen depleted exhaust air can, among other applications, be used for inerting fuel tanks.

It has been known to dry this oxygen depleted exhaust air in order to prevent water from entering fuel tanks. In this manner the danger of micro-organisms forming in a usually hygroscopic aircraft fuel is significantly reduced. In the state of the art, commonly, equipment is used that by cooling the air to be dried enforces condensation or freezing of the moisture contained in the air.

To this effect, for example DE 10 2009 051 212 A1 and WO 2011 051 210 A1 disclose a device that comprises a cooling element connected to a heat sink, with a first surface and a removal device, wherein water vapor separated in air to be dried freezes while flowing along the first surface and is removed by the removal device.

Other objects, desirable features and characteristics will become apparent from the subsequent summary and detailed description, and the appended claims, taken in conjunction with the accompanying drawings and this background.

SUMMARY

To increase the overall efficiency of an aircraft, to reduce maintenance expenditure, and to simplify the design it would be sensible to use a device for drying oxygen-depleted exhaust air of a fuel cell, which device has the simplest possible design, requires little maintenance and is of lightweight construction.

Accordingly, the various teachings of the present disclosure provides a system for supplying an aircraft with inert gas, which system allows drying of oxygen-depleted exhaust air of a fuel cell, which drying is as efficient and reliable as possible. The various teachings of the present disclosure also provides a method for supplying the aircraft with inert gas in which method oxygen-depleted exhaust air of a fuel cell is dried in as passive a manner as possible.

In various embodiments, a system for supplying an aircraft with inert gas comprises at least one fuel cell with an air inlet and an exhaust air outlet as well as a membrane device with an inlet, an outlet and a membrane surface, wherein the exhaust air outlet is in fluid communication with the inlet of the membrane device, and wherein the membrane device is adapted for guiding a gas from the inlet to the outlet and to give off to the outside through the membrane any water vapor contained in said gas.

The system according to the present disclosure is based on the integration of a fuel cell that is adapted for generating electricity when supplied with a fuel and an oxidant, wherein water arises as a by-product. With the use of air as an oxidant, which air is, for example, obtained from exhaust air of a cabin or from cooled bleed air from aircraft engines, during the fuel cell process only the oxygen content of the air is reduced, after which the oxygen reduced air leaves the fuel cell. The reduction in the oxygen content is significant with a suitable design of the air supply, and consequently the oxygen-depleted exhaust air obtained from the aforesaid is inert to such an extent that it can be used as inert gas for inerting those regions of fuel tanks that do not contain fuel. As mentioned above, any ingress of water in fuel tanks is to be avoided because it would encourage the growth of micro-organisms in the fuel or in the fuel tank. During the fuel cell process, as a result of the reaction of hydrogen with oxygen, a considerable quantity of water arises that is discharged with the exhaust air from the fuel cell. Drying of this oxygen-depleted exhaust air is thus sensible. Therefore, as a result of the electricity generated, the system according to the present disclosure can also be a system for supplying an aircraft with electrical power and inert gas.

According to various embodiments, for drying, a membrane device is used, which is to be interpreted as a device which allows a gas flow from its inlet to its outlet, wherein the flow path between the inlet and the outlet is delimited to the outside by a membrane so that the flowing gas establishes contact with an active membrane surface. The membrane in one example, comprises a pore-less structure of hydrophobic molecules, which structure at least in some regions comprises hydrophilic molecules. As a result of the pore-less structure, the gas that flows from the inlet to the outlet cannot find its way to the outside through the membrane surface. However, as a result of the at least hydrophilic molecular components water vapor molecules are taken up and are transported through the membrane surface to the outside where they are carried away, for example by the incident flow of external air. The difference in the temperature and in the water vapor concentration between the inside of the flow path and the outside of the membrane provides the driving force for the water vapor transport. The larger the given difference the more efficient is the functioning of the water vapor transport. Furthermore, the membranes comprise a dynamic operating principle, which means that the greater the number of water vapor molecules ready for transport through the membrane to the outside, the faster and more effective said water vapor molecules are transported. In one example, the membrane can be made from a polyether ester.

In one embodiment the membrane device is constructed as an exhaust air pipe, wherein the membrane is arranged on the external surface of the exhaust air pipe and is in fluid communication with the flow cross-section of the exhaust air pipe. As soon as exhaust air passes through, water vapor is given off through the membrane towards the outside. In this arrangement the membrane can form the external surface or can be contained in said external surface so that said membrane in a jacket-shaped manner at least in part encloses the flow cross-section.

The exhaust air pipe can be constructed in various ways. In a conventional application, for example in functional clothing, the active material of a membrane is usually very thin. Designing a rather thin film-like membrane to form a longish exhaust air pipe could result in inadvertent damage during installation or during use as a result of the application of excessive pressure. It may thus make sense to additionally provide a support structure for the exhaust air pipe, which support structure comprises at least in part openings that are covered by the membrane. This could take place in the form of several membranes or several connected membrane sections of a continuous membrane. Hose-like lines could suggest themselves as a support structure, which lines provide a degree of flexibility and are easy to install. In the application in an aircraft it must, in particular, be ensured that the material used can withstand the expected differences in temperature and pressure without being damaged. The use of thermoplastics or elastomers suggests itself; the use of metallic materials in the form of braiding comprising a multitude of thin wires is also imaginable.

In one embodiment a fuel line is arranged within the exhaust pipe, thus forming an interior line cross-section. In this arrangement the actual fuel-carrying line can continuously be exposed to a stream of oxygen-depleted exhaust air so that any fuel leakages that may occur can be forced back to the fuel source by the flow of oxygen-depleted exhaust air.

In one example, the membrane device is designed as a double-walled fuel line, wherein an interior line cross-section is constructed so as to be fuel-tight for carrying fuel, and comprises an outer jacket, which is spaced apart from the inner flow cross-section, which outer jacket at least in part comprises a membrane that is in fluid communication with the surroundings of the outer jacket, wherein an outer flow cross-section between the outer jacket and the inner flow cross-section is in fluid communication with the exhaust air outlet of the fuel cell. Fuel lines that are planned anyway and that are designed in a double-walled construction can thus be implemented by a double-walled fuel line that comprises the membrane, and consequently without incurring any additional weight a further function is carried out which results in the dehumidification of oxygen-depleted exhaust air.

In one example, the flow of exhaust air from the fuel cell and the flow of fuel through the interior line cross-section are in opposed directions. The inert gas flowing through the cross-sectional region that can be connected to the exhaust air outlet can be channeled against the direction of fuel flow into a fuel tank, wherein along the entire length of the fuel line a flow around the fuel line takes place, and any fuel that might issue from a leakage position is channeled to the fuel tank.

It could furthermore be advantageous to construct the outer jacket or the membrane so that it is transparent at least in some regions so that any fuel leakages can be detected by visual checks.

Moreover, it would be advantageous to enclose the inner flow cross-section with an insulation layer which is followed, spaced apart from the aforesaid, by the outer jacket. This results in the oxygen-depleted humid air channeled through the outer flow cross-section not directly establishing contact with, in some cases, very cold fuel over a relatively thin layer of material, and consequently any condensation or freezing of water vapor accumulated in the exhaust air is prevented. This can be advantageous, in particular, when the fuel line is used to channel hydrogen from a cryogenic hydrogen tank, for example, to the fuel cell or other hydrogen-consuming devices. In this process the hydrogen gas conveyed through the fuel line could be at a temperature that is significantly below the freezing point of water, which would result in an immediate accumulation of ice and the resulting blockage of the outer flow cross-section. As a result of the insulation layer and the constant inflow of warm exhaust air from the fuel cell, a temperature equilibrium can form on the outer surface of the insulation layer, which temperature equilibrium is above the freezing point of water.

In one embodiment the membrane device is designed as a gas-gas dehumidifier comprising a housing through which gas can flow, with a gas inlet and a gas outlet, wherein an exhaust air pipe with an exhaust air inlet and an exhaust air outlet leads through the housing, wherein the exhaust air pipe at least in some part is designed as a membrane whose inside is in fluid communication with an interior of the exhaust air pipe, and whose outside is in fluid communication with the interior of the housing. In this arrangement the exhaust air inlet is furthermore in fluid communication with the exhaust air outlet of the fuel cell. In this manner an airflow, for example from an air-conditioning system of an aircraft, by being channeled through the gas inlet can be humidified by taking up water vapor by way of the membrane, while at the same time the oxygen-depleted exhaust air in the exhaust air pipe is dehumidified. The relative atmospheric humidity of the channeled-in gas flow could be used to achieve a more agreeable condition of air in a ventilated space of the aircraft, for example for cockpit ventilation. Likewise the supply air for a fuel cell, which supply air is necessary for the fuel cell process, could be humidified in order to positively support the necessary humidity management, in particular in the context of a PEM fuel cell.

According to various embodiments, method for supplying an aircraft with inert gas comprises channeling oxygen-depleted exhaust air from a fuel cell to an inlet of a membrane device that comprises a membrane and that guides the exhaust air from the inlet to an outlet; removing water vapor issuing through the membrane; and channeling dried exhaust air issuing from the outlet of the membrane device to a fuel tank for inerting a space. In this context the term "space" can refer to a fuel tank, a cargo compartment or some other spatially delimited region within the aircraft. In this manner the above-mentioned advantages of the present disclosure can be achieved. As a result of the electricity generated, the method can also be a method for supplying an aircraft with electrical power and inert gas.

In one exemplary embodiment a gas stream is guided along the outside of the membrane in order to take up water vapor from the exhaust air by way of the membrane. As a result of the continuous inflow of an externally supplied gas, local high concentration of water vapor outside the membrane can be prevented so that a continuous flow of water vapor from the oxygen-depleted exhaust air is not limited. In this arrangement the gas stream can comprise a gas stream present in the surroundings of the membrane device, for example in a triangular region of an aircraft, or can comprise a gas stream that has been caused in a targeted manner, for example in the form of an air stream flowing through a housing of a gas-gas dehumidifier.

In one embodiment guiding an externally supplied gas comprises guiding conditioned air from an air-conditioning system of the aircraft, and guiding humidified conditioned air to a space within the aircraft. In this manner it is possible, as stated above, to channel air from an air-conditioning system, so that said air is humidified in a targeted manner into a space to be air conditioned or to be ventilated. Persons present in the space find such air considerably more agreeable than non-humidified air, which is quite dry, from an air-conditioning system.

The present disclosure further relates to the use of a membrane for removing water vapor from oxygen-depleted exhaust air of a fuel cell.

Furthermore, the present disclosure also relates to an aircraft with a system for supplying the aircraft with inert gas as stated above. In one embodiment the membrane device is designed as an exhaust air pipe that is generally installed in a particularly well-ventilated region of the aircraft. Said region could be situated just underneath a cabin floor in a laterally-directed region delimited by the outer skin of the fuselage and an adjacent cargo compartment. Air from a cabin is sucked, by way of free flow cross-sections, for example in dado panels, by way of one or several recirculation fans, into this so-called triangular region, and from there is partially recirculated. If in that location an exhaust air pipe as stated above is installed, which exhaust air pipe is able to continuously give off water vapor, this giving-off can be significantly improved by the continuous incident flow of cabin air, and on the other hand it is also possible to achieve humidification of the air taken up, which air is to be recirculated.

In one exemplary embodiment it is also possible to use a gas-gas dehumidifier that as a compact unit is arranged locally, for example just upstream of a corresponding inert gas inlet in a space, for example a fuel tank. Generally, in this arrangement a sub-section upstream or downstream of the dehumidifying device can be arranged in such a manner that the dehumidified oxygen-depleted exhaust air needs to be guided against gravity into the inert gas inlet. Any condensate arising can, in the manner of a siphon, be prevented from entering the fuel tank and in that location can be removed by way of a drain. In this arrangement the gas-gas dehumidifier comprises an exhaust air pipe in a housing through which a gas, for example, air, flows, i.e. the housing is ventilated.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein:

FIG. 1 discloses the system according to various embodiments in a diagrammatic block-based presentation.

FIG. 2 shows a simple exhaust air pipe as a membrane device.

FIGS. 3A and 3B show exhaust air pipes with integrated fuel lines.

FIGS. 4A and 4B show mechanically reinforced exhaust air pipes as membrane devices.

FIG. 5 shows a gas-gas dehumidifier as a membrane device.

DETAILED DESCRIPTION

Figure 6:
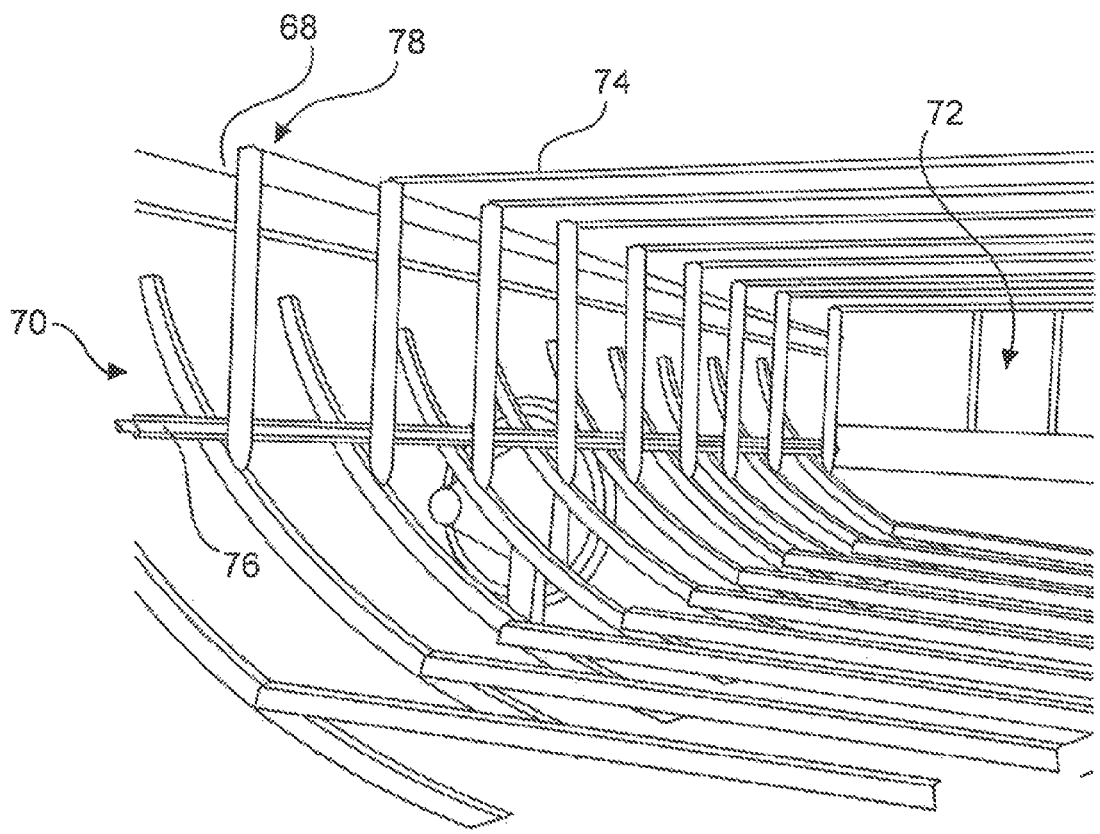
FIG. 6 shows an arrangement of an exhaust air pipe in the interior of an aircraft cabin.

The following detailed description is merely exemplary in nature and is not intended to limit the present disclosure or the application and uses of the present disclosure. Furthermore, there is no intention to be bound by any theory presented in the preceding background or the following detailed description.

FIG. 1 outlines the system 2 according to various embodiments for supplying an aircraft with inert gas, which system 2 comprises a fuel cell 4 and a membrane device 6. For operation in an aircraft, the fuel cell 4 is generally adapted for using air as an oxidant, which air can be bleed air, fresh air from an air-conditioning system, cabin exhaust air or ram air. There is thus no need for carrying along oxygen in separate high-pressure bottles. Accordingly, the fuel cell 4 comprises an air inlet 8 and a fuel inlet 10 which is, for example, supplied with hydrogen ($H_2$) or a hydrogen-containing gas mixture. During the process taking place in the fuel cell at least part of the oxygen contained in the air is consumed, and consequently oxygen-depleted or inert exhaust air subsequently flows from an exhaust air outlet 12. The exhaust air of a fuel cell 4 is usually relatively humid because during the fuel cell process the hydrogen contained in the fuel reacts with the oxygen contained in the air, thus forming water. For the oxygen-depleted, slow-reacting inert exhaust air to be able to be used for inerting purposes it is necessary to carry out dehumidification.

For this purpose the membrane device 6 with a semi-permeable or water vapor permeable membrane follows on from the exhaust air outlet 12, with the aforesaid guiding air from an inlet 14 to an outlet 16, wherein because of the semi-permeability the water vapor contained in the exhaust air, from the exhaust air issues through the membrane to the outside while the exhaust air does not leave the flow cross-section of the membrane device 6 between the inlet 14 and the outlet 16. Depending on the design of the membrane device 6 the oxygen-depleted exhaust air flowing from the outlet 16 is significantly drier than the inflowing air.

Subsequently, the dried inert exhaust air can be channeled through an inert gas inlet 18 into a region 20 of a fuel tank, which region 20 is not full of fuel, in order to prevent a potentially combustible or explosive fuel-air mixture from forming. This is to be considered necessary because in particular during emptying of the fuel tanks and during a landing approach and the resulting higher ambient pressure when compared to cruise flight, this region 20 must be filled with gas or air in order to prevent negative pressure therein.

FIG. 2 shows one exemplary embodiment of a membrane device in the form of an exhaust air pipe 24 whose wall 26 at least in part comprises a suitable water-vapor-permeable membrane material. Exhaust air 28, which by way of an inlet 25 flows through the exhaust air pipe 24 to an outlet 27, gives off dissolved water molecules by way of the membrane material 26 to the surroundings of the exhaust air pipe 24. Consequently, the exhaust air 28 is dried and exits at the outlet 27 in a drier state than it entered the exhaust air pipe 24 at the inlet 25. The thickness of the membrane material can be selected so that the exhaust air pipe 24 withstands the mechanical loads occurring during operation of the aircraft. For alternative designs, reference is made to the explanations provided below in the context of FIGS. 4A and 4B.

The degree of drying provided by this variant strongly depends on the membrane material used, on the temperature gradients resulting between the exhaust air 28 and the surroundings of the exhaust air pipe 24, and on the corresponding discharge of the water vapor issued through the membrane material. The latter could be improved by arranging the exhaust air pipe 24 in a particularly well-ventilated region so that there is no local concentration of water vapor or local increase in the relative atmospheric humidity on the outside of the exhaust air pipe 24. By correspondingly routing the exhaust air pipe 24 in regions of known temperature behavior that promotes the passage of water vapor, the temperature gradient can be influenced. In particular, the temperature should be significantly above the freezing point of water.

FIG. 3A shows a modification of the variant shown in FIG. 2, in which modification an exhaust air pipe 30, whose wall 32 also is made from or comprises a membrane material, additionally encloses a fuel line 34. The latter is adapted for channeling fuel 36 from a fuel tank 22 to fuel-consuming devices, which apart from engines, APUs or the like also could comprise a reformer (not shown) that produces a hydrogen-containing gas from a fuel 36 comprising hydrocarbons. In one example, there is a space between the wall 32 of the exhaust air pipe 30 and the internal fuel line 34, through which space exhaust air 28 can be conveyed from an inlet 31 to an outlet 33 generally against the direction of flow of the fuel 36.

The fuel lines in a modern aircraft are frequently already of a double-walled design, and consequently this double-walled design according to FIG. 3A could be modified in order to achieve advantageous passive drying of exhaust air 28 with little or even without any additional weight. At the same time the flow of oxygen-depleted air 28 could be suitable to flow around any leaks in the fuel line 34 so that any leaking fuel 36 can largely be prevented from spreading as a result of the flow of oxygen-depleted exhaust air 28. With an adequate volume flow and pressure of the oxygen-depleted exhaust air 28, furthermore, flowing of the fuel 36 from any leakages to the fuel tank 22 can take place and it can be ensured that the dripping-out fuel does not flow in the wrong direction.

Because of the exposed position of fuel tanks in an aircraft, for example integrated in wings, at times the temperature of the fuel can be very low so that there is a danger of condensed water or even ice accumulating on the outside of the fuel line 34 through which cold fuel flows. In order to avoid this, in FIG. 3B a modification of the exhaust air pipe 30 is shown in which the interior fuel line 34 is enclosed by an insulation layer 38, followed at a certain distance by the wall 32. The insulation layer can be made from any material suitable for thermal insulation. In one example, in order to maintain a constant external diameter the use of a foamed plastic material of a certain rigidity suggests itself, which plastic material should nevertheless be as flexible as possible in order to allow easy installation of this double-walled line construction. In order to prevent fuel 36 from being absorbed by the insulation layer 38 in the case of a leakage in the fuel line 34 the insulation layer 38 should in one example, be made as closed-cell foamed plastic. As a result of the uniform diameter the conveyance of fuel is not impeded by the inert gas 28.

The membrane material to be used can be relatively thin in order to be able to provide particularly effective giving-off of water vapor. However, in the context of installing an exhaust air pipe comprising a membrane material it should be noted that the strength of this membrane material is not sufficient as the sole wall material of an exhaust air pipe. Purely as examples FIGS. 4A and 4B show that an exhaust air pipe thus need not exclusively comprise a thin membrane material, but instead for reinforcement could comprise a suitable frame structure that can absorb the mechanical loads arising while nevertheless allowing a degree of shaping.

As an example FIG. 4A shows an exhaust air pipe 40 that comprises a frame structure with stiffening elements 42 extending in the axial direction and with radial stiffening rings 44 spaced apart from each other in the axial direction, over which radial stiffening rings 44 a membrane material 46, which for example is relatively thin, has been stretched, which membrane material 46 defines an inlet 41 and an outlet 43.

In a manner that differs slightly from the above, FIG. 4B shows an exhaust air pipe 48 with an inlet 49 and an outlet 51, wherein the exhaust air pipe 48 comprises a lattice structure 50 over which also a membrane material 46 has been stretched.

The exhaust air pipes 40 and 48 can of course also be used with double-walled designs as shown in FIGS. 3A and 3B.

FIG. 5 shows a further variant of a membrane device in the form of a gas-gas dehumidifier 52. Said dehumidifier 52 comprises an exhaust air inlet 54, an exhaust air outlet 56, a gas inlet 58 and a gas outlet 60. Between the exhaust air inlet 54 and the exhaust air outlet 56 again an exhaust air pipe 62 extends whose wall 64 is made of or comprises a membrane material. Water vapor dissolved in the through-flowing exhaust air 28 passes through the wall 64 into a housing 66 that encloses the exhaust air pipe 62. The gas flowing through the gas inlet 58 into the housing 66 takes up the water vapor and in a humidified state exits to the outside through the gas outlet 60. In this arrangement it is not necessary to accommodate an exhaust air pipe 62 in a ventilated region; instead, a gas that flows in the aircraft anyway, for example from an air-conditioning system, could be used to take up the water vapor. With the above it is possible, for example, to supply slightly humidified air to a space to be air conditioned.

Of course, the exhaust air pipes from FIGS. 2 to 4B that are used in such a gas-gas dehumidifier 52 can be situated upstream or downstream of the aforesaid in order to carry out dehumidification that is as ideal as possible.

The arrangement of exhaust air pipes in an aircraft is particularly located in heavily ventilated regions, in the case of a modern commercial aircraft in particular in a triangular region 68, in other words between an outer skin 70 and a lateral delimitation 78 of a cargo compartment 72 underneath a cabin floor 74. At that location air is sucked, by way of one or several recirculation fans, from a cabin that follows on at the top, from where at least some of the air enters the ventilation circuit again. In one example, a drainage line 76 can be situated in the triangular region 68 so that the issuing humidity is admixed to the cabin exhaust air in order to be partially recirculated.

Figure 7:
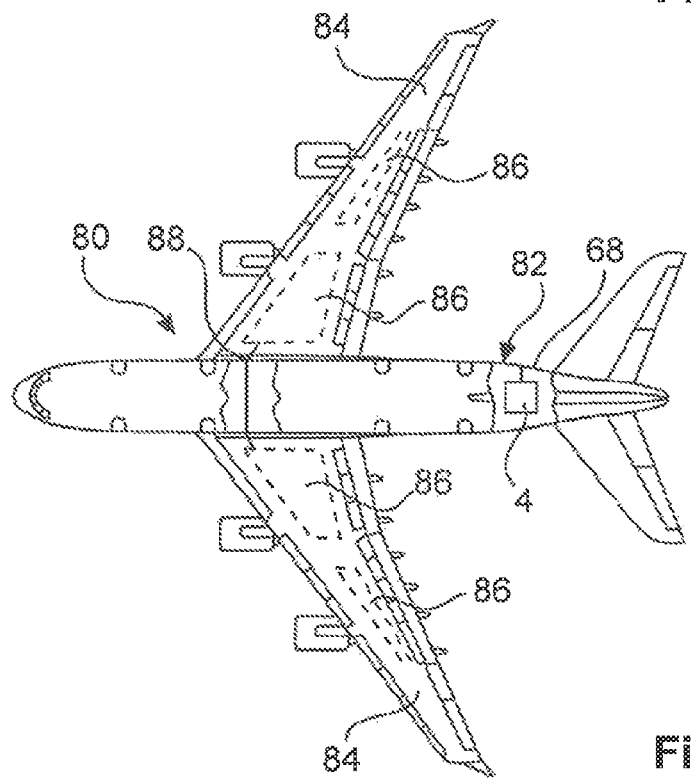
FIG. 7 shows an aircraft comprising a system according to various embodiments.

Lastly, FIG. 7 shows an aircraft 80 which, for example, in an aft region comprises a fuel cell 4 that is connected to an exhaust air pipe 82, wherein this exhaust air pipe 82, for example, extends forward towards the triangular region 68. Fuel tanks 86 are located in wings 84, wherein the regions of said fuel tanks 86, which regions are not filled with fuel, are to be inerted. The exhaust air pipe branches in a nodal point 88 and conveys the inert gas to the individual tanks 86. The particular exhaust air pipe 82 is, for example, designed according to the characteristics shown in FIGS. 2 to 4B or, in a manner that differs from the above, can comprise a conventional line material, wherein in this case a gas-gas dehumidifier 52 follows. As an alternative to this it would also be possible to use a combination of an exhaust air pipe from FIGS. 2 to 4B and of a gas-gas dehumidifier 52.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A system for supplying an aircraft with inert gas, comprising:
   at least one fuel cell with an air inlet and an exhaust air outlet;
   a membrane device with an inlet, an outlet and a vapor-permeable membrane,
   wherein the exhaust air outlet is in fluid communication with the inlet of the membrane device, and
   wherein the membrane device is adapted for guiding a gas from the inlet to the outlet and to give off to an outside through the membrane any water vapor contained therein;
   wherein the membrane device is constructed as an exhaust air pipe,
   wherein the membrane is arranged on the external surface of the exhaust air pipe and is in fluid communication with a flow cross-section of the exhaust air pipe, and
   wherein a fuel line is arranged within the exhaust air pipe.

2. The system of claim 1,
   wherein the membrane device is constructed as an exhaust air pipe, and
   wherein the membrane is arranged on the external surface of the exhaust air pipe and is in fluid communication with a flow cross-section of the exhaust air pipe.

3. The system of claim 2,
   wherein the exhaust air pipe comprises a support structure that comprises at least in part openings that are covered by the membrane.

4. The system of claim 2,
   wherein the exhaust air pipe is a double-walled fuel line,
   wherein the fuel line comprises an interior line cross-section that is constructed so as to be fuel-tight for carrying fuel, and comprises an outer jacket, which is spaced apart from the interior line cross-section, and the outer jacket at least in part comprises a membrane that is in fluid communication with the surroundings of the outer jacket, and
   wherein an outer flow cross-section between the outer jacket and the interior line cross-section is in fluid communication with the exhaust air outlet of the fuel cell.

5. The system of claim 4,
   wherein the flow of exhaust air from the fuel cell and the flow of fuel through the interior line cross-section are in opposite directions.

6. The system of claim 4,
   wherein an insulation layer encloses the interior line cross-section.

7. The system of claim 1,
   wherein the membrane device is designed as a gas-gas dehumidifier comprising a housing through which gas can flow, with a gas inlet and a gas outlet, and an exhaust air pipe with an exhaust air inlet and an exhaust air outlet leads through the housing, with the exhaust air pipe at least in some part designed as a membrane whose inside is in fluid communication with an interior of the exhaust air pipe, and whose outside is in fluid communication with the interior of the housing.

8. A method for supplying an aircraft with inert gas, comprising:
   channeling oxygen-depleted exhaust air from a fuel cell to an inlet of a membrane device that comprises a membrane and that guides the exhaust air from the inlet to an outlet;
   removing water vapor issuing through the membrane; and
   channeling dried exhaust air issuing from the membrane device to inert a space;
   wherein the membrane device is constructed as an exhaust air pipe,
   wherein the membrane is arranged on an external surface of the exhaust air pipe and is in fluid communication with a flow cross-section of the exhaust air pipe, and
   wherein a fuel line is arranged within the exhaust air pipe.

9. The method of claim 8,
   wherein a gas stream is guided along the outside of the membrane device in order to take up water vapor from the exhaust air by way of the membrane device.

10. The method of claim 9,
    wherein guiding the gas stream comprises guiding conditioned air from an air-conditioning system of the aircraft, and guiding humidified conditioned air to a space within the aircraft.

11. An aircraft, comprising:
    a system that supplies the aircraft with inert gas, the system including at least one fuel cell with an air inlet and an exhaust air outlet, a membrane device with an inlet, an outlet and a vapor-permeable membrane,
    wherein the exhaust air outlet is in fluid communication with the inlet of the membrane device, and the membrane device is adapted for guiding a gas from the inlet to the outlet and to give off to an outside through the membrane any water vapor contained therein, and
    wherein the membrane device is designed as an exhaust air pipe that is installed in a ventilated region of the aircraft;
    wherein the membrane device is constructed as an exhaust air pipe,
    wherein the membrane is arranged on the external surface of the exhaust air pipe and is in fluid communication with a flow cross-section of the exhaust air pipe, and
    wherein a fuel line is arranged within the exhaust air pipe.

12. The aircraft of claim 11,
    wherein the ventilated region is a triangular region of the aircraft.

13. The aircraft of claim 11,
    wherein the membrane device is designed as a gas-gas dehumidifier that as a compact unit is arranged in a region near an inert gas inlet of a space to be inerted.

14. The aircraft of claim 11,
    wherein the exhaust air pipe comprises a support structure that comprises at least in part openings that are covered by the membrane.

15. The aircraft of claim 11,
    wherein the exhaust air pipe is a double-walled fuel line,
    wherein the fuel line comprises an interior line cross-section that is constructed so as to be fuel-tight for carrying fuel, and comprises an outer jacket, which is spaced apart from the interior line cross-section, and the outer jacket at least in part comprises a membrane that is in fluid communication with the surroundings of the outer jacket, and
    wherein an outer flow cross-section between the outer jacket and the interior line cross-section is in fluid communication with the exhaust air outlet of the fuel cell.

16. The aircraft of claim 11,
    wherein the flow of exhaust air from the fuel cell and the flow of fuel through the interior line cross-section are in opposite directions.

* * * * *